United States Patent
Jin et al.

(10) Patent No.: US 11,162,898 B2
(45) Date of Patent: Nov. 2, 2021

(54) NON-INVASIVE SCATTERING IMAGING METHOD BEYOND MEMORY EFFECT RANGE BASED ON CONNECTED COMPONENT OPTIMIZATION

(71) Applicant: Tsinghua Shenzhen International Graduate School, Guangdong (CN)

(72) Inventors: Xin Jin, Guangdong (CN); Junqi Li, Guangdong (CN)

(73) Assignee: Tsinghua Shenzhen International Graduate School, Guangdong (CN)

( * ) Notice: Subject to any disclaimer, the term of this patent is extended or adjusted under 35 U.S.C. 154(b) by 0 days.

(21) Appl. No.: 16/930,302

(22) Filed: Jul. 15, 2020

(65) Prior Publication Data

US 2020/0348229 A1 Nov. 5, 2020

Related U.S. Application Data

(63) Continuation of application No. PCT/CN2020/080790, filed on Mar. 24, 2020.

(30) Foreign Application Priority Data

Apr. 19, 2019 (CN) .......................... 201910319306.6

(51) Int. Cl.
  *G01B 9/02* (2006.01)
  *G01N 21/47* (2006.01)

(52) U.S. Cl.
  CPC ..... *G01N 21/4795* (2013.01); *G01N 21/4788* (2013.01); *G01N 2021/479* (2013.01)

(58) Field of Classification Search
  CPC ........... G01N 21/4795; G01N 21/4788; G01N 2021/479; G01B 9/02083; G01B 9/02094; G01B 9/02096
  See application file for complete search history.

(56) References Cited

U.S. PATENT DOCUMENTS

| | | | |
|---|---|---|---|
| 2002/0030812 A1 | 3/2002 | Ortyn | |
| 2002/0093655 A1 | 7/2002 | Everett | |
| 2019/0005351 A1* | 1/2019 | Zhou | ....................... G06T 7/254 |

FOREIGN PATENT DOCUMENTS

| | | |
|---|---|---|
| CN | 104865234 A | 8/2015 |
| CN | 105445492 A | 3/2016 |

(Continued)

OTHER PUBLICATIONS

Meijun Chen, Honglin Liu, Zhentao Liu, Puxiang Lai, and Shensheng Han, "Expansion of the FOV in speckle autocorrelation imaging by spatial filtering," Opt. Lett. 44, 5997-6000 (Year: 2019).*

(Continued)

*Primary Examiner* — Tarifur R Chowdhury
*Assistant Examiner* — Jonathon Cook
(74) *Attorney, Agent, or Firm* — Winston Hsu

(57) ABSTRACT

A non-invasive scattering imaging method beyond a memory effect range based on connected component optimization, including: calculating an autocorrelation image of collected speckle information, and obtaining an autocorrelation graph according to the autocorrelation image; obtaining a reconstruction result according to the autocorrelation graph, and optimizing the reconstruction result; calculating and normalizing autocorrelation of the optimized reconstruction result, to calculate initial autocorrelation of an object; obtaining a reconstruction result according to the autocorrelation of the object obtained in the previous step, calculating autocorrelation of an optimized reconstruction result by using a connected component and performing normalization, and using the autocorrelation graph to calculate autocorrelation of another object; and repeating the preceding steps of calculating autocorrelation of the two objects until a predetermined loop count is reached, and then using a phase recovery algorithm and the calculated autocorrelation of the two objects to perform spatial reconstruction to achieve non-invasive imaging.

9 Claims, 2 Drawing Sheets

(56) References Cited

FOREIGN PATENT DOCUMENTS

| CN | 105974430 A | 9/2016 |
| CN | 107247332 A | 10/2017 |
| CN | 109932816 A | 6/2019 |
| WO | 2018/195309 A1 | 10/2018 |

OTHER PUBLICATIONS

Jia Hui et al., "All-optical imaging and tracking technology for rectilinear motion targets through scattering media", 2018, coverpage & pp. 1~8, vol. 67, No. 22, 224202, Acta Physica Sinica, Chinese Physical Society, Institute of Physics, CAS.

Li Huijuan, "Research on Deep Depth-of-Field Imaging and Tracking of Moving Targets based on Light Scattering", Jun. 2017, coverpages & pp. 1~66, Xidian University.

Wu Tengfei, "Non-invasive Scattering Imaging Methods Based on Optical Memory Effect", Nov. 2017, coverpages & pp. 1~101, Xidian University.

Chengfei Guo et al., "Imaging through scattering layers exceeding memory effect range by exploiting prior information", 2018, pp. 1~7, Optics Communications.

Long Li et al., "Imaging through scattering layers exceeding memory effect range with spatial-correlation-achieved point-spread-function", Apr. 15, 2018, pp. 1670~1673, vol. 43, No. 8, Optics Letters, 2018 Optical Society of America.

* cited by examiner

NON-INVASIVE SCATTERING IMAGING METHOD BEYOND MEMORY EFFECT RANGE BASED ON CONNECTED COMPONENT OPTIMIZATION

CROSS REFERENCE TO RELATED APPLICATIONS

This application is a continuation application of PCT/CN2020/080790 filed on 2020 Mar. 24, which claims priority to CN patent application NO. 201910319306.6 filed on 2019 Apr. 19. The contents of the above-mentioned application are all hereby incorporated by reference.

BACKGROUND OF THE INVENTION

1. Field of the Invention

The present invention relates to the field of computer imaging, and in particular, to a non-invasive scattering imaging method beyond a memory effect range based on connected component optimization.

2. Description of the Related Art

Scattering media widely exist in nature and have uneven refractive index and reflectance distribution. After light passes through a scattering medium, original information is seriously disturbed, which impedes direct analysis of object information in a traditional optical system. An imaging technology under the action of scattering media has a good application prospect in the fields of biomedical imaging, remote sensing, and the like.

Existing scattering imaging methods are mainly classified into two categories: a ballistic light-based method or a memory effect-based method. The ballistic light-based method includes optical coherence tomography (OCT), photon accumulation imaging, time-domain photon statistical distribution, and two-photon microscopy. These methods require large equipment as support, and because an amount of ballistic light decays exponentially with the enhancement of a scattering effect of a scattering medium, the methods are only suitable for scenarios with a weak scattering effect. The memory effect-based technology include wavefront shaping, a speckle scanning collecting system, a single-shot speckle correlation imaging system, and a PSF deconvolution method. Wavefront shaping and the deconvolution method usually require system calibration, guiding stars, or the like, and the application scenarios are greatly restricted due to an invasive imaging method. Although the speckle scanning collecting system and the single-shot speckle correlation imaging system can achieve non-invasive imaging of strong scattering media, an imaging range is limited by a memory effect range, and therefore an object with a large viewing angle cannot be imaged.

The above content disclosed in the background is only used to assist in understanding the concepts and the technical solutions of the present invention, but does not necessarily belong to the prior art of this application. In the absence of clear evidence that the above content has been disclosed on the filing date of this application, the background should not be used to evaluate novelty and inventiveness of this application.

SUMMARY OF THE INVENTION

In order to resolve the above technical problems, the present invention provides a non-invasive scattering imaging method beyond a memory effect range based on connected component optimization, to achieve scattering imaging of a plurality of objects in a wide viewing angle range.

In order to achieve the above objectives, the present invention adopts the following technical solutions:

The present invention discloses a non-invasive scattering imaging method beyond a memory effect range based on connected component optimization, including the following steps:

A1: collecting speckle information of a to-be-imaged sample, where the to-be-imaged sample includes continuous first and second objects whose sizes are within a memory effect range but distances are beyond the memory effect range;

A2: calculating an autocorrelation image of the speckle information collected in step A1, and obtaining an autocorrelation graph according to the autocorrelation image;

A3: obtaining a reconstruction result of the first object or the second object according to the autocorrelation graph of step A2, and optimizing the reconstruction result of the first object or the second object by using a connected component;

A4: calculating and normalizing autocorrelation of the reconstruction result that is of the first object or the second object and that is optimized in step A3, and using the autocorrelation graph to calculate initial autocorrelation of the second object or the first object accordingly;

A5: obtaining a reconstruction result of the second object or the first object accordingly according to the autocorrelation of the second object or the first object obtained in the previous step, optimizing the reconstruction result of the first object or the second object by using the connected component, calculating and normalizing autocorrelation of the optimized reconstruction result of the second object or the first object, and using the autocorrelation graph to calculate autocorrelation of the first object or the second object accordingly;

A6: obtaining a reconstruction result of the first object or the second object accordingly according to the autocorrelation of the first object or the second object obtained in the previous step, optimizing the reconstruction result of the first object or the second object by using the connected component, calculating and normalizing autocorrelation of the optimized reconstruction result of the first object or the second object, and using the autocorrelation graph to calculate autocorrelation of the second object or the first object accordingly; and A7: repeating steps A5 and A6 until a predetermined loop count is reached, and then using a phase recovery algorithm and the calculated autocorrelation of the first object and the calculated autocorrelation of the second object to perform spatial reconstruction to achieve non-invasive imaging.

Preferably, step A1 specifically includes: using a single-shot speckle correlation imaging system and setting, as the to-be-imaged sample, the first object and the second object whose sizes are blocked by a scattering medium within the memory effect range but distances are beyond the memory effect range, speckle information I that is of the to-be-imaged sample and that is collected through non-correlated light irradiation being:

$$I = O_1 * PSF_1 + O_2 * PSF_2$$

$O_1$ and $O_2$ respectively represent the first object and the second object, $PSF_1$ and $PSF_2$ respectively represent point spread functions of scattering medium parts corresponding to the first object and the second object, and * represents a convolution operation.

Preferably, step A2 specifically includes: calculating an autocorrelation image of the speckle information collected in step A1 as:

$$I \sim\sim I = (O_1*PSF_1+O_2*PSF_2) \sim\sim (O_1*PSF_1+O_2*PSF_2) = (O_1 \sim\sim O_1) + (O_2 \sim\sim O_2) + C$$

where $\sim\sim$ is an autocorrelation operation, and C is a background item; and obtaining an autocorrelation graph D based on the autocorrelation image: $D = I \sim\sim I - C$.

Preferably, the obtaining a reconstruction result of the first object or the second object according to the autocorrelation graph of step A2 in step A3 specifically includes: using the phase recovery algorithm a plurality of times for the autocorrelation graph of step A2 to obtain the reconstruction result of the first object or the second object with a smallest recovery error.

Preferably, the optimizing the reconstruction result of the first object or the second object by using the connected component in steps A3, A5, and A6 specifically includes:

moving a reconstruction result $S_k$ of an object to a center, then dividing the reconstruction result $S_k$ of the object into n regions according to connected components, and arranging the regions in descending order according to sizes of the connected components: $\varepsilon_1, \varepsilon_2 \ldots \varepsilon_n$, n representing a number of the connected components in the reconstruction result and being a positive integer not less than 2; normalizing the reconstruction result $S_k$ of the object; and obtaining the reconstruction result $S_k'$ that is of the object and that is optimized by using the connected component:

$$S_k'(x, y) = \begin{cases} S_k(x, y), & (x, y) \in \varepsilon \text{ and } S_k(x, y) < averageS_k \\ averageS_k, & (x, y) \in \varepsilon \text{ and } S_k(x, y) \geq averageS_k \\ 0, & (x, y) \notin \varepsilon \end{cases}$$

where when k is 1, $S_k$ represents the reconstruction result of the first object, and $S_k'$ represents the reconstruction result that is of the first object and that is optimized by using the connected component; when k is 2, $S_k$ represents the reconstruction result of the second object, and $S_k'$ represents the reconstruction result that is of the second object and that is optimized by using the connected component; and average $S_k$ represents an average of all pixels greater than 0.1 in the reconstruction result, and $\varepsilon = \{(x,y), |(x,y) \in \varepsilon_1, \varepsilon_2\}$.

Preferably, step A4 specifically includes: calculating and normalizing the autocorrelation of the reconstruction result that is of the first object or the second object and that is optimized in step A3, and subtracting a half of the normalized autocorrelation of the optimized reconstruction result of the first object or the second object according to the autocorrelation graph to calculate the initial autocorrelation of the second object or the first object accordingly.

Preferably, the obtaining a reconstruction result of the first object accordingly according to the autocorrelation of the first object obtained in the previous step in steps A5 and A6 specifically includes: using the phase recovery algorithm a plurality of times for the autocorrelation of the first object to obtain a reconstruction result of the first object with a minimum recovery error; and the obtaining a reconstruction result of the second object accordingly according to the autocorrelation of the second object obtained in the previous step in steps A5 and A6 specifically includes: using the phase recovery algorithm a plurality of times for the autocorrelation of the second object to obtain a reconstruction result of the second object with a minimum recovery error.

Preferably, the calculating and normalizing autocorrelation of the optimized reconstruction result of the first object, and using the autocorrelation graph to calculate autocorrelation of the second object accordingly in steps A5 and A6 specifically includes: calculating and normalizing the autocorrelation of the optimized reconstruction result of the first object, and subtracting a half of the normalized autocorrelation of the optimized reconstruction result of the first object according to the autocorrelation graph to calculate the initial autocorrelation of the second object accordingly; and the calculating and normalizing autocorrelation of the optimized reconstruction result of the second object, and using the autocorrelation graph to calculate autocorrelation of the first object accordingly in steps A5 and A6 specifically includes: calculating and normalizing the autocorrelation of the optimized reconstruction result of the second object, and subtracting a half of the normalized autocorrelation of the optimized reconstruction result of the second object according to the autocorrelation graph to calculate the initial autocorrelation of the first object accordingly.

Preferably, step A7 specifically includes: repeating steps A5 and A6 until the autocorrelation of the first object and the autocorrelation of the second object are correctly separated after the predetermined loop count is reached, and using the phase recovery algorithm and the calculated autocorrelation of the first object and the calculated autocorrelation of the second object to perform spatial reconstruction to achieve non-invasive imaging.

Compared with the prior art, the present invention has the following beneficial effects: According to the non-invasive scattering imaging method beyond a memory effect range based on connected component optimization disclosed in the present invention, autocorrelation of collected speckle information is approximately equal to linear superposition of speckle autocorrelation of each individual object, and mixed signals are separated based on autocorrelation separation of linear subtraction. In addition, the method based on connected component optimization guarantees direction convergence of iterative optimization, and finally achieves accurate separation and recovery of two objects with completely aliased autocorrelation and non-invasive imaging of two objects whose distances are beyond a memory effect range, thereby achieving scattering imaging of a plurality of objects with a wide viewing angle. In the method of the present invention, sampling needs to be performed only once to achieve non-invasive imaging of two objects whose distances are beyond a memory effect range, and no other prior information is required except that each object has only a single connected component and that transmission areas and transmittance of the two objects are similar, thereby greatly improving an imaging range of the speckle-related method.

These and other objectives of the present invention will no doubt become obvious to those of ordinary skill in the art after reading the following detailed description of the preferred embodiment that is illustrated in the various figures and drawings.

DETAILED DESCRIPTION

The present invention is further described below with reference to the accompanying drawings and preferred embodiments.

Figure 1:
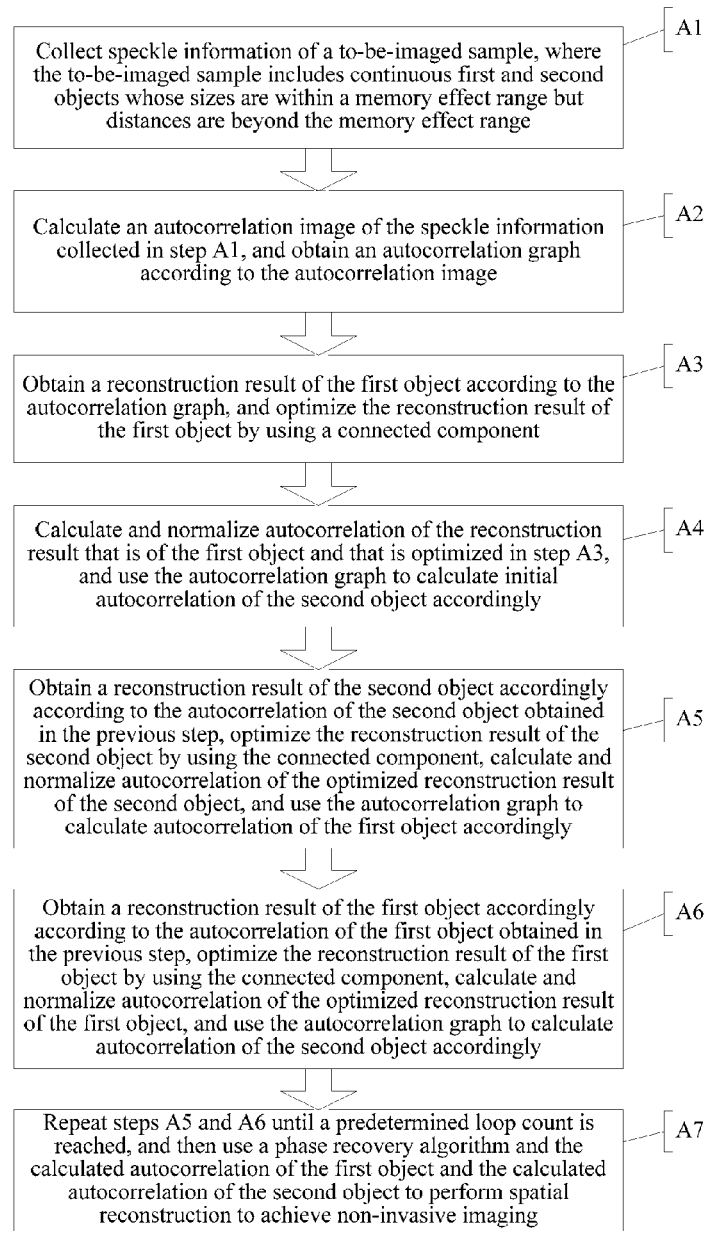
FIG. 1 is a flowchart of a non-invasive scattering imaging method beyond a memory effect range based on connected component optimization according to a preferred embodiment of the present invention.

As shown in FIG. 1, a preferred embodiment of the present invention discloses a non-invasive scattering imaging method beyond a memory effect range based on connected component optimization, including the following steps:

A1: Collect speckle information of a to-be-imaged sample, where the to-be-imaged sample includes two continuous objects whose sizes are within a memory effect range.

In particular, a single-shot speckle correlation imaging system is used and the two objects whose sizes are blocked by a scattering medium within the memory effect range but distances are beyond the memory effect range is set as the to-be-imaged sample, where speckle information that is of the sample and that is collected through non-correlated light irradiation may be represented as:

$$I = O_1 * PSF_1 + O_2 * PSF_2$$

$O_1$ and $O_2$ respectively represent the first object and the second object, $PSF_1$ and $PSF_2$ respectively represent point spread functions of scattering medium parts corresponding to the first object and the second object, and * represents a convolution operation.

A2: Calculate an autocorrelation image of the speckle information collected in step A1, and obtain an autocorrelation graph according to the autocorrelation image.

Specifically, the collected speckle information by a low-frequency filtered image envelope to sharpen a speckle image and reduce noise, then the autocorrelation image of the speckle information after fitting is calculated, and then background item (a minimum value of intensity of the speckle autocorrelation image) is subtracted to obtain the autocorrelation graph.

A calculation formula of the autocorrelation image of the speckle information after fitting is:

$$I \sim\sim I = (O_1 * PSF_1 + O_2 * PSF_2) \sim\sim (O_1 * PSF_1 + O_2 * PSF_2) =$$
$$(O_1 \sim\sim O_1) + (O_2 \sim\sim O_2) + C$$

I is the speckle information, $\sim\sim$ is an autocorrelation operation, and C is background item.

It can be seen from the above formula that the autocorrelation image of the speckle information is a sum of autocorrelation of two objects plus the background item C. In order to remove the background item C, the minimum value of $I\sim\sim I$ (namely, the background item C) is subtracted and normalized to obtain the autocorrelation graph $D = I\sim\sim I - C$.

A3: Use a phase recovery algorithm a plurality of times for the autocorrelation graph to obtain a reconstruction result with a minimum recovery error, and optimize the reconstruction result by using a connected component.

Connected component optimization includes:

(1) Move a reconstruction result $S_k$ of an object to a center;
(2) Divide the reconstruction result $S_k$ of the object into a plurality of regions according to connected components, and arrange the regions in descending order according to sizes of the connected components: $\varepsilon_1$, $\varepsilon_2$ ... $\varepsilon_n$, (the reconstruction result of the object includes a plurality of connected components, and is divided into n connected components according to the connected component theory, n representing a number of the connected components in the reconstruction result and being a positive integer not less than 2; and the connected components are arranged according to areas of the connected components, the largest one being $\varepsilon_1$, followed by $\varepsilon_2$, and so on).

$$\text{Let } \varepsilon = \{(x, y), \mid (x, y) \in \varepsilon_1, \varepsilon_2\}; \qquad (3)$$

$$\text{Normalize } S_k; \qquad (4)$$

$$\text{Let } S'_k(x, y) = \begin{cases} S_k(x, y), & (x, y) \in \varepsilon \text{ and } S_k(x, y) < averageS_k \\ averageS_k, & (x, y) \in \varepsilon \text{ and } S_k(x, y) \geq averageS_k \\ 0, & (x, y) \notin \varepsilon \end{cases} \qquad (5)$$

$S_k$ represents the reconstruction result of the object, and $S_k'$ represents the reconstruction result that is of the object and that is optimized by using the connected component. Specifically, when k is 1, $S_k$ represents a reconstruction result of the first object, and $S_k'$ represents a reconstruction result that is of the first object and that is optimized by using the connected component; when k is 2, $S_k$ represents a reconstruction result of the second object, and $S_k'$ represents a reconstruction result that is of the second object and that is optimized by using the connected component; and average $S_k$ represents an average of all pixels greater than 0.1 in the reconstruction result.

A4: Calculate and normalize autocorrelation of the optimized reconstruction result of the first object, and use the autocorrelation graph to calculate initial autocorrelation of the second object accordingly.

Specifically, the autocorrelation of $S_1'$ is calculated and normalized to obtain $C_1$, and the autocorrelation graph D minus the intensity-halved $C_1$ to obtain $C_2$, that is:

(1) $C_1 = S_1' \sim\sim S_1'$;
(2) Normalize $C_1$;
(3) $C_2 = S_2 \sim\sim S_2 = D - 0.5 \cdot C_1$.

A5: Obtain a reconstruction result of the second object accordingly according to the autocorrelation of the second object obtained in the previous step, optimize the reconstruction result of the second object by using the connected component, calculate and normalize autocorrelation of the optimized reconstruction result of the second object, and use the autocorrelation graph to calculate new autocorrelation of the first object accordingly.

The previous step in step A5 is specifically: the previous step is step A4 when step A5 is executed for the first time, that is, the autocorrelation of the second object obtained in the previous step refers to the initial autocorrelation of the second object obtained in step A4. When the looping step of step A7 is performed, that is, when step A5 is performed for the second time or after the second time, the previous step is step A6 of the previous loop, that is, the autocorrelation of the second object obtained in the previous step is the autocorrelation of the second object obtained in step A6 of the previous loop.

Specifically, the phase recovery algorithm is used a plurality of times for the autocorrelation $C_2$ of the second object to obtain a reconstruction result $S_2$ with a minimum recovery error; the reconstruction result $S_2'$ is optimized by using the connected component to obtain an optimized reconstruction result $S_2'$, autocorrelation of the optimized reconstruction result $S_2'$ is calculated and normalized to obtain $C_2$, and the autocorrelation graph D minus the intensity-halved $C_2$ to obtain $C_1$, that is:

(1) When step A5 is performed for the first time, use the initial autocorrelation $C_2$ of the second object as input, use the phase recovery algorithm a plurality of times, and take a result with a minimum error as a current reconstruction result $S_2$ of the second object; and when step A5 is performed for the second time or after the second time, use the autocorrelation $C_2$ of the second object in step A6 of the previous loop as input, use the phase recovery algorithm a plurality of times, and take a result with a minimum error as the current reconstruction result $S_2$ of the second object;

(2) Optimize the reconstruction result $S_2$ by using the connected component optimization method in step A3 to obtain $S_2'$;

(3) $C_2 = S_2' \sim\sim S_2'$;

(4) Normalize $C_2$; and (5) $C_1 = S_1 \sim\sim S_1 = D - 0.5 \cdot C_2$.

A6: Obtain a reconstruction result of the first object accordingly according to the autocorrelation of the first object obtained in the previous step, optimize the reconstruction result of the first object by using the connected component, calculate and normalize autocorrelation of the optimized reconstruction result of the first object, and use the autocorrelation graph to calculate autocorrelation of the second object accordingly.

The previous step in step A6 is specifically step A5 corresponding to a loop count.

Specifically, the phase recovery algorithm is used a plurality of times for the autocorrelation $C_1$ of the first object to obtain a reconstruction result $S_1$ with a minimum recovery error; the reconstruction result $S_1$ is optimized by using the connected component to obtain an optimized reconstruction result $S_1'$, autocorrelation of the optimized reconstruction result $S_1'$ is calculated and normalized to obtain $C_1$, and the autocorrelation graph D minus the intensity-halved $C_1$ to obtain $C_2$, that is:

(1) Use new autocorrelation $C_1$ of the first object as input, use the phase recovery algorithm a plurality of times, and take a result with a minimum error as a current reconstruction result $S_1$ of the first object;

(2) Optimize the reconstruction result $S_1$ by using the connected component optimization method in step A3 to obtain $S_1'$;

(3) $C_1 = S_1' \sim\sim S_1'$;

(4) Normalize $C_1$; and (5) $C_2 = S_2 \sim\sim S_2 = D - 0.5 \cdot C_1$.

A7: Repeat steps A5 and A6 until a predetermined loop count is reached, and use the phase recovery algorithm is used for the autocorrelation of the two output objects to achieve imaging of the two objects.

Specifically, after steps A5 and A6 are repeated a plurality of times, the reconstruction result $S_1$ of the first object and the reconstruction result $S_2$ of the second object are closer to the real first object and the real second object, respectively. After the predetermined loop count, the autocorrelation of the two objects is correctly separated. Finally, the phase recovery algorithm is used to achieve non-invasive imaging of two objects whose distances are beyond a memory effect range.

Figure 2:
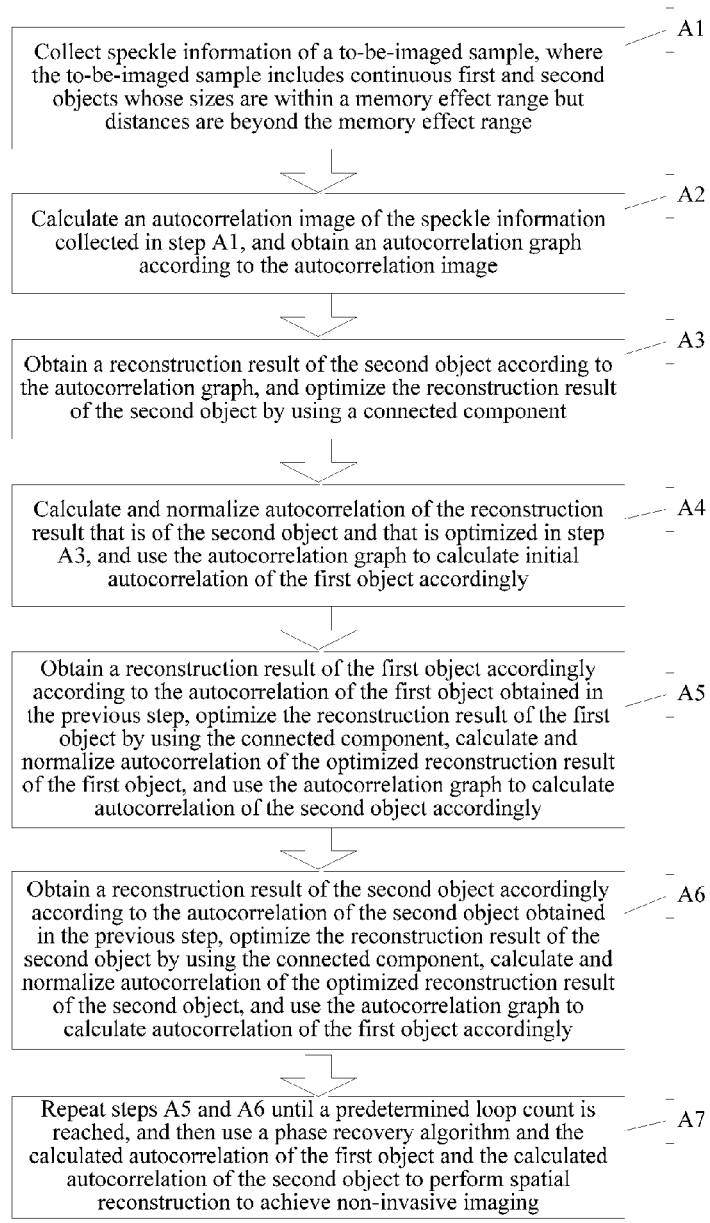
FIG. 2 is a flowchart of a non-invasive scattering imaging method beyond a memory effect range based on connected component optimization according to another preferred embodiment of the present invention.

As shown in FIG. 2, in another preferred embodiment, step A4 may be alternatively: autocorrelation of the optimized reconstruction result of the second object is calculated and normalized, and the autocorrelation graph is used to calculate initial autocorrelation of the first object accordingly. Correspondingly, step A5 is: a reconstruction result of the first object is obtained accordingly according to the autocorrelation of the first object obtained in the previous step, the reconstruction result of the first object is optimized by using the connected component, autocorrelation of the optimized reconstruction result of the first object is calculated and normalized, and the autocorrelation graph is used to calculate new autocorrelation of the second object accordingly. Correspondingly, step A6 is: a reconstruction result of the second object is obtained accordingly according to the autocorrelation of the second object obtained in the previous step, the reconstruction result of the second object is optimized by using the connected component, autocorrelation of the optimized reconstruction result of the second object is calculated and normalized, and the autocorrelation graph is used to calculate autocorrelation of the first object accordingly.

According to the non-invasive scattering imaging method beyond a memory effect range based on connected component optimization provided in this preferred embodiment of the present invention, when each object falls within a memory effect range and a distance is beyond the memory effect range, autocorrelation of collected speckles may be simplified as linear superposition of speckle autocorrelation of each single object. In addition, mixed signals are separated based on autocorrelation separation of linear subtraction, and phase information lost in autocorrelation is recovered based on the phase recovery algorithm. The method based on connected component optimization guarantees direction convergence of iterative optimization, and finally achieves accurate separation and recovery of two objects with completely aliased autocorrelation and non-invasive imaging of two objects whose distances are beyond a memory effect range, thereby achieving scattering imaging of a plurality of objects with a wide viewing angle. In the method in this preferred embodiment of the present invention, sampling needs to be performed only once to achieve non-invasive imaging of two objects whose distances are beyond a memory effect range, and no other prior information is required except that each object has only a single connected component (each object is connected in space) and that transmission areas and transmittance of the two objects are similar (two objects are of approximate intensity), thereby greatly improving an imaging range of the speckle-related method.

The background section of the present invention may include background information about a problem or an environment of the present invention, and does not necessarily describe the prior art. Therefore, the content in the background section is not the recognition of the prior art by an applicant.

The foregoing content further describes the present invention in detail with reference to specific/preferred embodiments, and the specification should not be construed as a limitation on the specific embodiments of the present invention. Various replacements and variations may be made to the embodiments described above by a person of ordinary skill in the art without departing from the concept of the present invention, and such replacements and variations shall fall within the protection scope of the present invention. In the description of this specification, the description of the reference terms such as "an embodiment", "some embodiments", "preferred embodiment", "example", "specific example", or "some examples" means that the specific features, structures, materials or characteristics described with reference to the embodiment or example are included in at least one embodiment or example of the present invention. In this specification, schematic descriptions of the foregoing terms do not necessarily directed at a same embodiment or example. In addition, the described specific features, structures, materials, or features can be combined in a proper manner in any one or more embodiments or examples. In a case that is not mutually contradictory, a person skilled in the art can combine or group different embodiments or examples that are described in this specification and features of the different embodiments or examples. Although the embodiments and advantages of the present invention are described in detail, it should be understood that, various changes, replacements and variations may be made in this specification without departing from the protection scope of patent application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-invasive scattering imaging method beyond a memory effect range based on connected component optimization, comprising the following steps:

A1: collecting speckle information of a to-be-imaged sample by using a single-shot speckle correlation imaging system and non-correlated light irradiation, wherein the to-be-imaged sample comprises continuous first and second objects whose sizes are within a memory effect range but distances are beyond the memory effect range;

A2: calculating an autocorrelation image of the speckle information collected in step A1, and obtaining an autocorrelation graph according to the autocorrelation image;

A3: obtaining a reconstruction result of the first object or the second object according to the autocorrelation graph of step A2, and optimizing the reconstruction result of the first object or the second object by using a connected component;

A4: calculating and normalizing autocorrelation of the reconstruction result that is of the first object or the second object and that is optimized in step A3, and using the autocorrelation graph to calculate initial autocorrelation of the second object or the first object accordingly;

A5: obtaining a reconstruction result of the second object or the first object accordingly according to the autocorrelation of the second object or the first object obtained in the previous step, optimizing the reconstruction result of the first object or the second object by using the connected component, calculating and normalizing autocorrelation of the optimized reconstruction result of the second object or the first object, and using the autocorrelation graph to calculate autocorrelation of the first object or the second object accordingly;

A6: obtaining a reconstruction result of the first object or the second object accordingly according to the auto-correlation of the first object or the second object obtained in the previous step, optimizing the reconstruction result of the first object or the second object by using the connected component, calculating and normalizing autocorrelation of the optimized reconstruction result of the first object or the second object, and using the autocorrelation graph to calculate autocorrelation of the second object or the first object accordingly; and A7: repeating steps A5 and A6 until a predetermined loop count is reached, and then using a phase recovery algorithm and the calculated autocorrelation of the first object and the calculated autocorrelation of the second object to perform spatial reconstruction to achieve non-invasive imaging.

2. The non-invasive scattering imaging method beyond a memory effect range according to claim 1, wherein step A1 specifically comprises: using the single-shot speckle correlation imaging system and setting, as the to-be-imaged sample, the first object and the second object whose sizes are blocked by a scattering medium within the memory effect range but distances are beyond the memory effect range, speckle information I that is of the to-be-imaged sample and that is collected through the non-correlated light irradiation being:

$$I = O_1 * PSF_1 + O_2 * PSF_2$$

wherein $O_1$ and $O_2$ respectively represent the first object and the second object, $PSF_1$ and $PSF_2$ respectively represent point spread functions of scattering medium parts corresponding to the first object and the second object, and * represents a convolution operation.

3. The non-invasive scattering imaging method beyond a memory effect range according to claim 2, wherein step A2 specifically comprises: calculating an autocorrelation image of the speckle information collected in step A1 as:

$$I \sim\sim I = (O_1 * PSF_1 + O_2 * PSF_2) \sim\sim (O_1 * PSF_1 + O_2 * PSF_2) = \\ (O_1 \sim\sim O_1) + (O_2 \sim\sim O_2) + C$$

wherein $\sim\sim$ is an autocorrelation operation, and C is a background item; and obtaining an autocorrelation graph D based on the autocorrelation image: $D = I \sim\sim I - C$.

4. The non-invasive scattering imaging method beyond a memory effect range according to claim 1, wherein the obtaining a reconstruction result of the first object or the second object according to the autocorrelation graph of step A2 in step A3 specifically comprises: using the phase recovery algorithm a plurality of times for the autocorrelation graph of step A2 to obtain a reconstruction result of the first object or the second object with a minimum recovery error.

5. The non-invasive scattering imaging method beyond a memory effect range according to claim 1, wherein the optimizing the reconstruction result of the first object or the second object by using the connected component in steps A3, A5, and A6 specifically comprises:

moving a reconstruction result $S_k$ of an object to a center, then dividing the reconstruction result $S_k$ of the object into n regions according to connected components, and arranging the regions in descending order according to sizes of the connected components: $\varepsilon_1, \varepsilon_2 \ldots \varepsilon_n$, n representing a number of the connected components in the reconstruction result and being a positive integer not less than 2; normalizing the reconstruction result $S_k$ of the object; and obtaining the reconstruction result $S_k'$ that is of the object and that is optimized by using the connected component:

$$S_k'(x, y) = \begin{cases} S_k(x, y), & (x, y) \in \varepsilon \text{ and } S_k(x, y) < averageS_k \\ averageS_k, & (x, y) \in \varepsilon \text{ and } S_k(x, y) \geq averageS_k \\ 0, & (x, y) \notin \varepsilon \end{cases}$$

wherein when k is 1, $S_k$ represents the reconstruction result of the first object, and $S_k$ represents the reconstruction result that is of the first object and that is optimized by using the connected component; when k is 2, $S_k$ represents the reconstruction result of the second object, and $S_k$ represents the reconstruction result that is of the second object and that is optimized by using the connected component; and average $S_k$ represents an average of all pixels greater than 0.1 in the reconstruction result, and $\varepsilon=\{(x,y),|(x,y)\in\varepsilon_1,\varepsilon_2\}$.

6. The non-invasive scattering imaging method beyond a memory effect range according to claim 1, wherein step A4 specifically comprises: calculating and normalizing the autocorrelation of the reconstruction result that is of the first object or the second object and that is optimized in step A3, and subtracting a half of the normalized autocorrelation of the optimized reconstruction result of the first object or the second object according to the autocorrelation graph to calculate the initial autocorrelation of the second object or the first object accordingly.

7. The non-invasive scattering imaging method beyond a memory effect range according to claim 1, wherein the obtaining a reconstruction result of the first object accordingly according to the autocorrelation of the first object obtained in the previous step in steps A5 and A6 specifically comprises: using the phase recovery algorithm a plurality of times for the autocorrelation of the first object to obtain a reconstruction result of the first object with a minimum recovery error; and the obtaining a reconstruction result of the second object accordingly according to the autocorrelation of the second object obtained in the previous step in steps A5 and A6 specifically comprises: using the phase recovery algorithm a plurality of times for the autocorrelation of the second object to obtain a reconstruction result of the second object with a minimum recovery error.

8. The non-invasive scattering imaging method beyond a memory effect range according to claim 1, wherein the calculating and normalizing autocorrelation of the optimized reconstruction result of the first object, and using the autocorrelation graph to calculate autocorrelation of the second object accordingly in steps A5 and A6 specifically comprises: calculating and normalizing the autocorrelation of the optimized reconstruction result of the first object, and subtracting a half of the normalized autocorrelation of the optimized reconstruction result of the first object according to the autocorrelation graph to calculate the initial autocorrelation of the second object accordingly; and the calculating and normalizing autocorrelation of the optimized reconstruction result of the second object, and using the autocorrelation graph to calculate autocorrelation of the first object accordingly in steps A5 and A6 specifically comprises: calculating and normalizing the autocorrelation of the optimized reconstruction result of the second object, and subtracting a half of the normalized autocorrelation of the optimized reconstruction result of the second object according to the autocorrelation graph to calculate the initial autocorrelation of the first object accordingly.

9. The non-invasive scattering imaging method beyond a memory effect range according to claim 1, wherein step A7 specifically comprises: repeating steps A5 and A6 until the autocorrelation of the first object and the autocorrelation of the second object are correctly separated after the predetermined loop count is reached, and using the phase recovery algorithm and the calculated autocorrelation of the first object and the calculated autocorrelation of the second object to perform spatial reconstruction to achieve non-invasive imaging.

* * * * *